United States Patent
Manneschi

(10) Patent No.: US 10,107,933 B2
(45) Date of Patent: Oct. 23, 2018

(54) INDIVIDUAL ACCESS CONTROL PORTAL INCLUDING IMPROVED CORRELATION MEANS BETWEEN AN ALARM DETECTION AND THE TRAVEL OF AN INDIVIDUAL

(71) Applicant: Costruzioni Elettroniche Industriali Automatismi S.p.A. C.E.I.A. S.P.A., Arezzo (IT)

(72) Inventor: Alessandro Manneschi, Arezzo (IT)

(73) Assignee: Costruzioni Elettroniche Industriali Automatismi S.P.A. C.E.I.A. S.P.A., Arezzo (IT)

( * ) Notice: Subject to any disclaimer, the term of this patent is extended or adjusted under 35 U.S.C. 154(b) by 16 days.

(21) Appl. No.: 14/825,381

(22) Filed: Aug. 13, 2015

(65) Prior Publication Data
US 2016/0047937 A1    Feb. 18, 2016

(30) Foreign Application Priority Data
Aug. 14, 2014  (FR) ...................... 14 57832

(51) Int. Cl.
G01V 5/00    (2006.01)
G01T 1/167   (2006.01)
G01V 8/20    (2006.01)
G01V 3/10    (2006.01)

(52) U.S. Cl.
CPC ............ G01V 5/0075 (2013.01); G01T 1/167 (2013.01); G01V 8/20 (2013.01); *G01V 3/10* (2013.01)

(58) Field of Classification Search
CPC ............................ G01V 8/20; G01V 5/0075
See application file for complete search history.

(56) References Cited

U.S. PATENT DOCUMENTS

| 6,037,870 | A   |   | 3/2000  | Alessandro      |
|-----------|-----|---|---------|-----------------|
| 6,094,472 | A   | * | 7/2000  | Smith ............. G01N 23/203 |
|           |     |   |         | 378/86          |
| 7,145,328 | B2  |   | 12/2006 | Manneschi       |
| 7,592,907 | B2  |   | 9/2009  | Manneschi et al.|
| 7,793,533 | B2  |   | 9/2010  | Manneschi       |
| 7,889,076 | B2  |   | 2/2011  | Manneschi et al.|
| 7,911,592 | B2  |   | 3/2011  | Chen et al.     |
| 8,030,948 | B2  |   | 10/2011 | Manneschi       |
| 8,125,335 | B2  |   | 2/2012  | Manneschi       |
| 8,400,512 | B2  |   | 3/2013  | Koch et al.     |

(Continued)

FOREIGN PATENT DOCUMENTS

| EP | 1750149 A2 | 2/2007 |
| EP | 2402914 A1 | 1/2012 |

*Primary Examiner* — Tony Ko
(74) *Attorney, Agent, or Firm* — Harness, Dickey & Pierce, PLC

(57) ABSTRACT

An individual access control portal includes two panels or columns that define a through corridor, which panels or columns are equipped with sensors designed to detect substances or materials liable to be carried by individuals travelling through the portal, wherein the portal is equipped with a plurality of detection barriers distributed along the direction of passage through the portal and logic means attached to the plurality of barriers, firstly to determine from the series of activations of the barriers, the place and movement of an individual and secondly to establish the correlations existing between the movement of an individual and the signals output by the substance or material detection sensors.

37 Claims, 7 Drawing Sheets

(56) References Cited

U.S. PATENT DOCUMENTS

| | | |
|---|---|---|
| 8,473,240 B2 | 6/2013 | Manneschi |
| 2015/0035521 A1 | 2/2015 | Manneschi |
| 2015/0035525 A1 | 2/2015 | Manneschi |

* cited by examiner

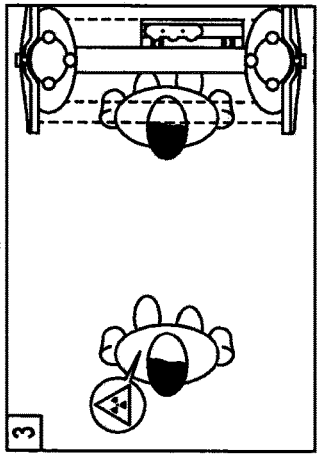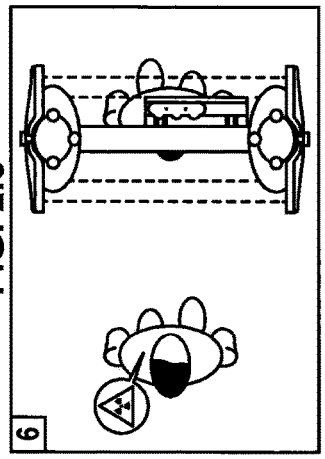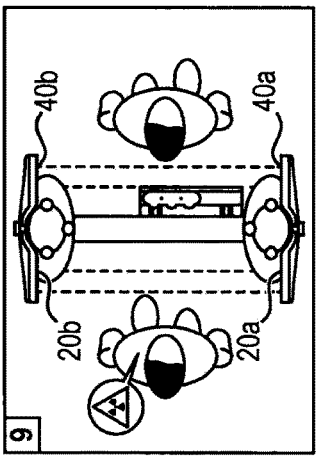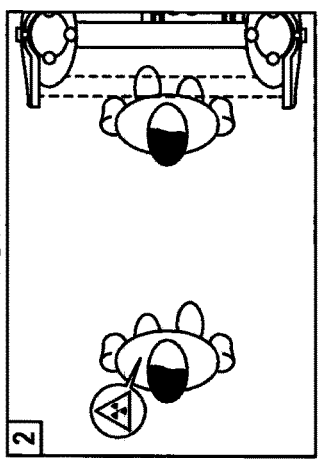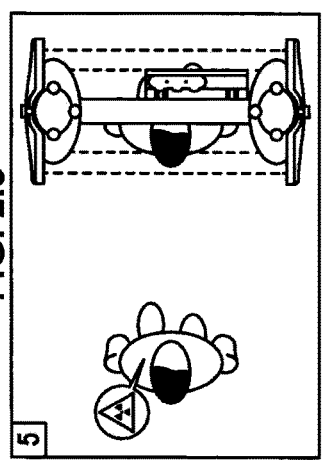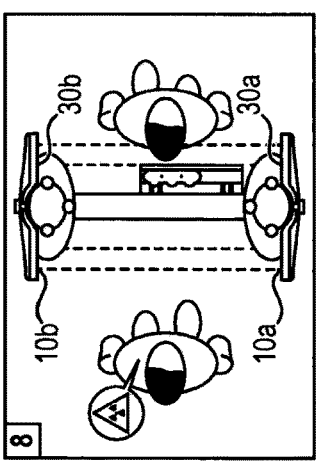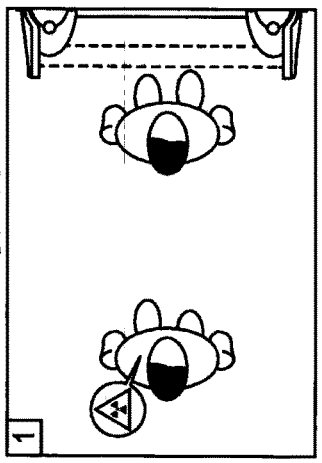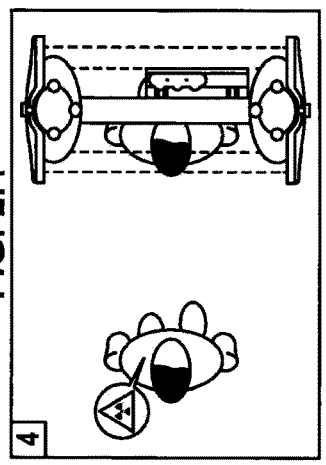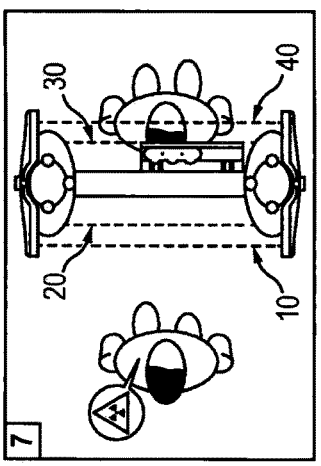

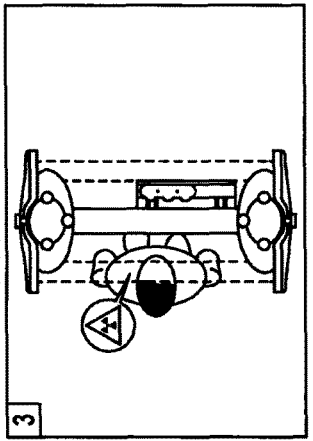
FIG. 4.3
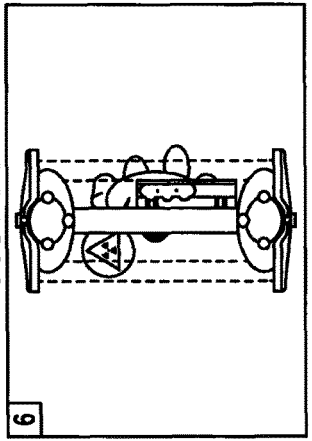
FIG. 4.6
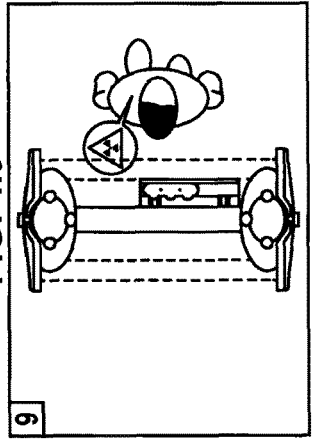
FIG. 4.9
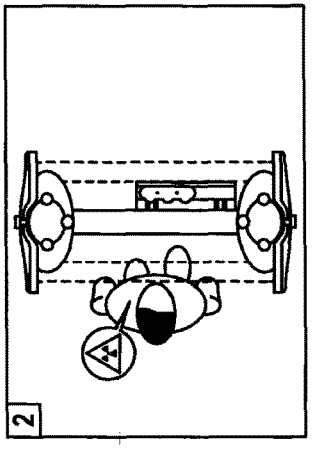
FIG. 4.2
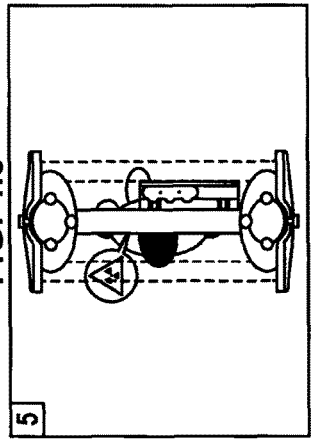
FIG. 4.5
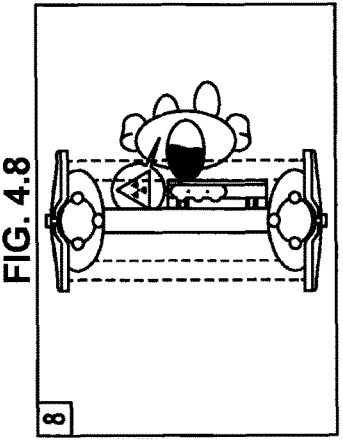
FIG. 4.8
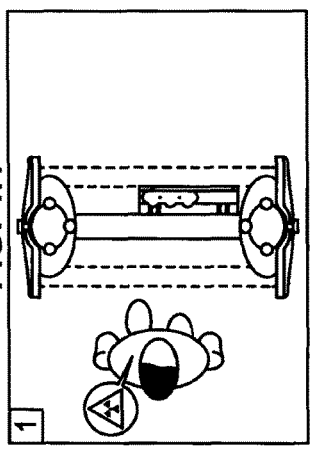
FIG. 4.1
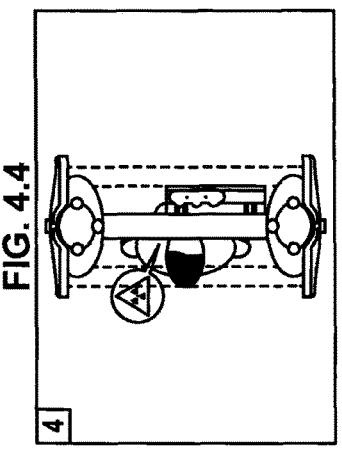
FIG. 4.4
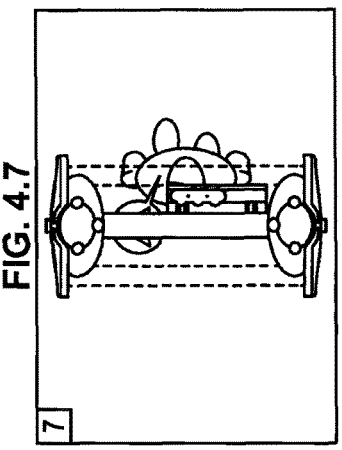
FIG. 4.7

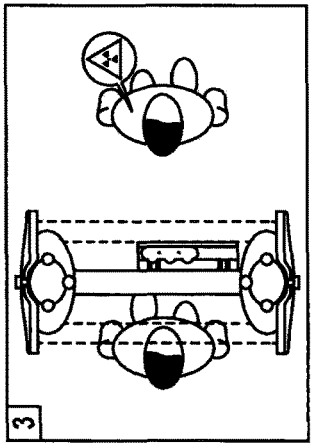
FIG. 6.1
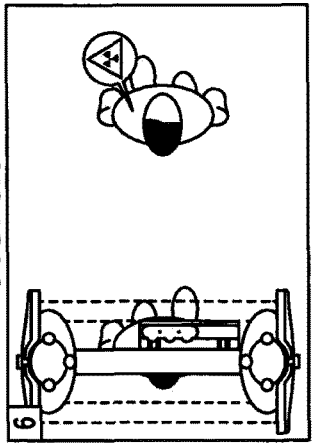
FIG. 6.2
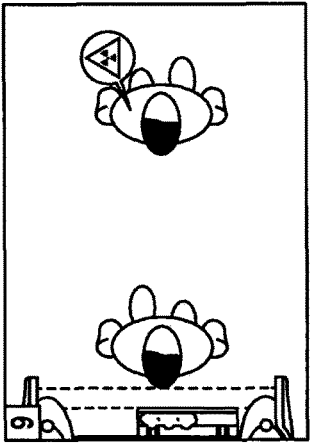
FIG. 6.3
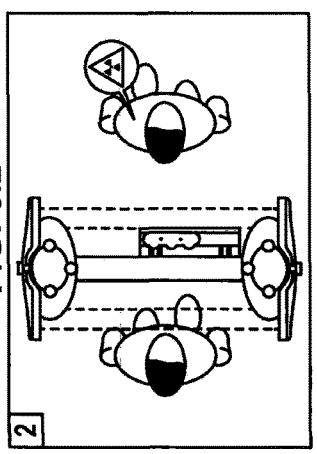
FIG. 6.4
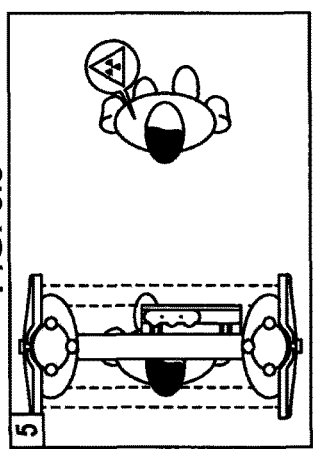
FIG. 6.5
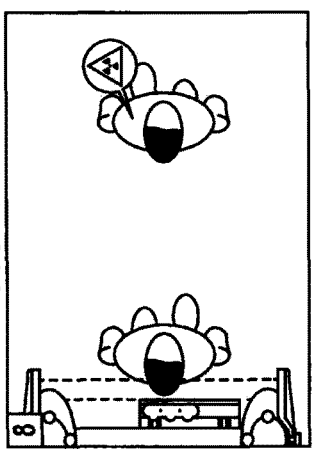
FIG. 6.6
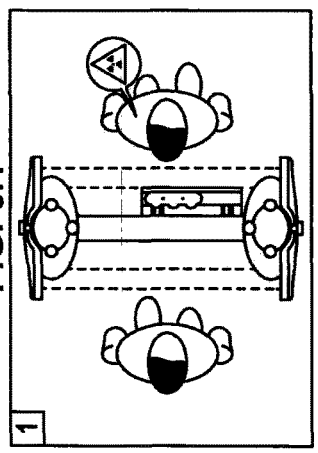
FIG. 6.7
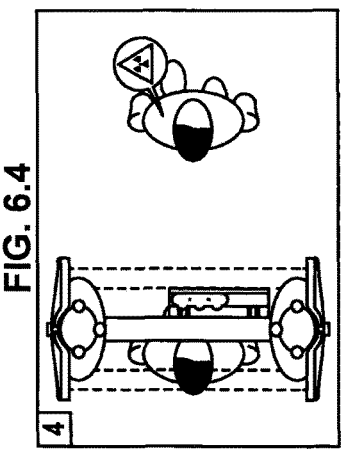
FIG. 6.8
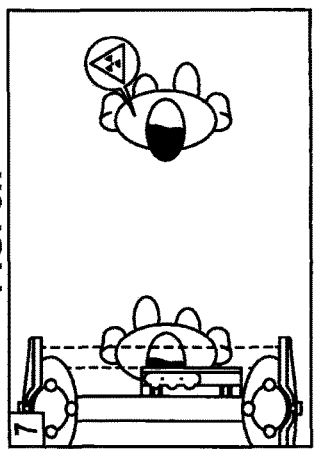
FIG. 6.9

INDIVIDUAL ACCESS CONTROL PORTAL INCLUDING IMPROVED CORRELATION MEANS BETWEEN AN ALARM DETECTION AND THE TRAVEL OF AN INDIVIDUAL

CROSS-REFERENCE TO RELATED APPLICATIONS

This application claims the benefit and priority of French Patent Application No. 1457832, filed Aug. 14, 2014. The entire disclosure of the above application is incorporated herein by reference.

BACKGROUND AND SUMMARY

The present invention relates to the field of access control portals. The invention is for example applicable to the control of access to airport departure lounges or to sensitive Government buildings or Institutions, without these applications being limiting.

Many access control portals for protected areas have been proposed. Examples of access control portals may be found in the documents FR 2 775 350, EP 1 394 570, EP 1 750 147, U.S. Pat. No. 7,592,907.

Generally access control portals define, as illustrated in the appended FIG. 1, a through corridor or channel 5 framed by two panels or columns 1, 2. The panels or columns 1, 2 comprise sensors designed to detect different types of substances or materials liable to be carried by individuals travelling through the portal. These sensors can comprise coils attached to means 4 forming generators to emit an electromagnetic field likely to detect metals carried by individuals travelling through the portal, by analysing the perturbations detected on the coils by logic means integrated into the means 4. Some portals are also equipped with means for analysing particular chemical substances or molecules, or else ionizing radiation such as such as gamma radiation.

The known access control portals have already been very useful. However they are not always totally satisfactory. Particularly in cases of heavy through traffic, it often happens that several individuals following each other at close distances lead to perturbations in the detection due to their closeness. In particular, it can happen that an alarm is attributed to an individual travelling through a portal that is in reality related to the individual following or preceding them. The individual checks that are then necessary are both disturbing for the individuals in question, complicated and a source of access delays.

The aim of the present invention is to improve the situation. This aim is achieved according to the invention using an individual access control portal comprising two panels or columns that define a through corridor, which panels or columns are equipped with sensors designed to detect substances or materials liable to be carried by individuals travelling through the portal, characterized by the fact that the portal is equipped with a plurality of individual detection barriers distributed along the direction of passage through the portal and logic means attached to the plurality of barriers, firstly to determine from the series of activations of said barriers the place and movement of an individual, and secondly to establish the correlations existing between the movement of an individual and the signals output by the substance or material detection sensors, the logic means being designed to detect the correlation between a peak output by the substance or material sensors and the simultaneous activation of two barriers located the nearest to the centre of the portal.

According to other advantageous features of the invention:
The detection barriers are optical barriers,
The number of detection barriers is greater than 3,
The number of detection barriers is equal to 4,
Provision is made for two barriers upstream and two barriers downstream of the detection sensors,
The logic means are designed to seek the correlations existing between the peaks of the signals output by the substance or material detection sensors and the simultaneous activation of two barriers located the nearest to the centre of the passage defined in the corridor or channel of the portal.

BRIEF DESCRIPTION OF THE DRAWINGS

Other features, aims and advantages of the present invention will become apparent on reading the following detailed description, with reference to the appended drawings given by way of non-limiting example and wherein:

FIGS. 2.1 to 2.9 schematically represent 9 successive sequences of travel through a portal by an individual without any dangerous substance or material, followed by an individual carrying a source of ionizing radiation;

FIGS. 4.1 to 4.9 represent nine successive sequences identical to FIG. 2 in the case of an individual passing through the portal carrying a source of ionizing radiation;

FIGS. 6.1 to 6.9 represent nine successive sequences illustrating the passage through the portal of an individual without any dangerous materials or substances, following an individual carrying a source of ionizing radiation.

DETAILED DESCRIPTION

Figure 1:
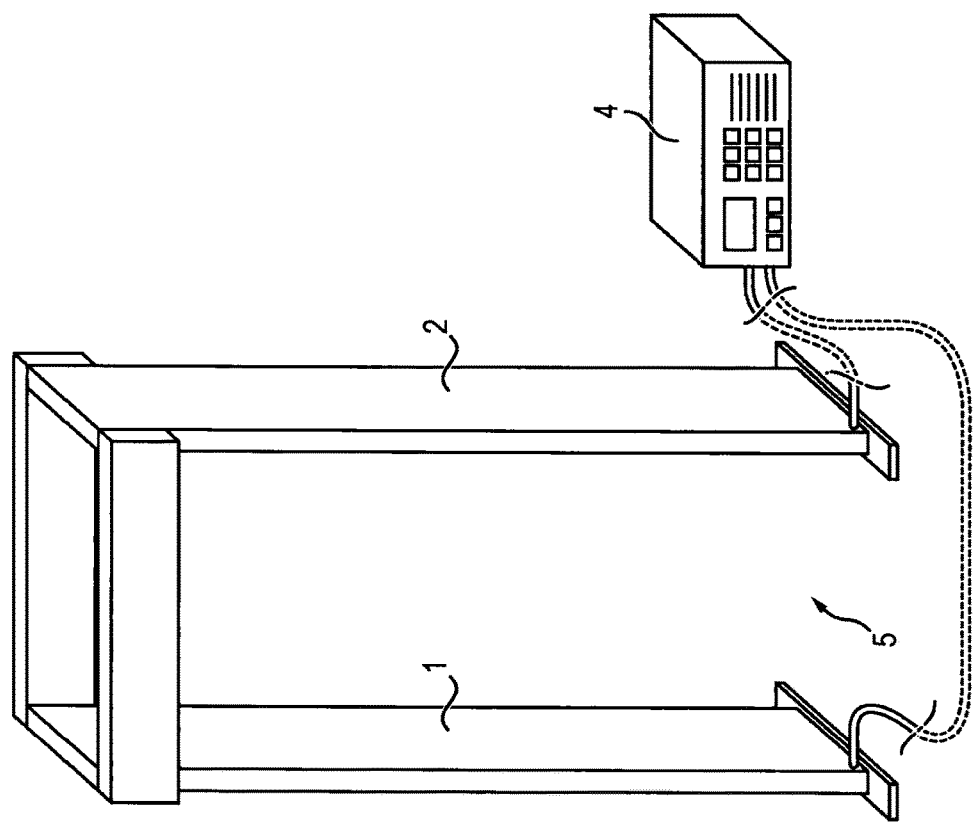
FIG. 1 represents a schematic perspective view of an access control portal of the prior art.

The general structure of the portals in accordance with the invention formed by two panels or columns 1, 2 surrounding a transfer corridor or channel 5 as well as the sensors forming a detector of metal or any other type of substance, including ionizing radiation, particularly gamma, is known to the person skilled in the art and will not be described in further detail below. By way of non-limiting example one may refer to the aforementioned documents FR 2 775 350, EP 1 394 570, EP 1 750 147, U.S. Pat. No. 7,592,907.

As seen in the appended FIGS. 2, 4 and 6, according to the invention the portal is equipped with a plurality of optical barriers 10, 20, 30, 40 distributed along the direction of passage through the portal. The term "distributed along the direction of passage through the portal" is understood to mean a layout of the barriers 10, 20, 30, 40 such that said barriers are successively crossed when an individual normally travels through the portal moving from the entrance to the exit, or else in the reverse direction.

Each optical barrier 10, 20, 30, 40 is preferably formed by a transmitter cell 10a, 20a, 30a, 40a located on one side of the through corridor or channel and a respectively associated receiver cell 10b, 20b, 30b, 40b located on the opposite side. More precisely transmitter and receiver cells 10a, 20a, 30a, 40a; 10b, 20b, 30b, 40b can be formed by a strip defining a globally vertical optical curtain covering most of the height of the transfer corridor or channel 5. In a variant each optical barrier 10, 20, 30, 40 can be formed by a plurality of transmitter cells 10a, 20a, 30a, 40a and respective receiver cells 10b, 20b, 30b, 40b distributed over the height of the corridor or channel 5 in order to detect with total certainty the passage of an individual whatever his or her position, i.e. the individual stands in the normal upright position or for example in any bent or stretched position.

Figure 3:
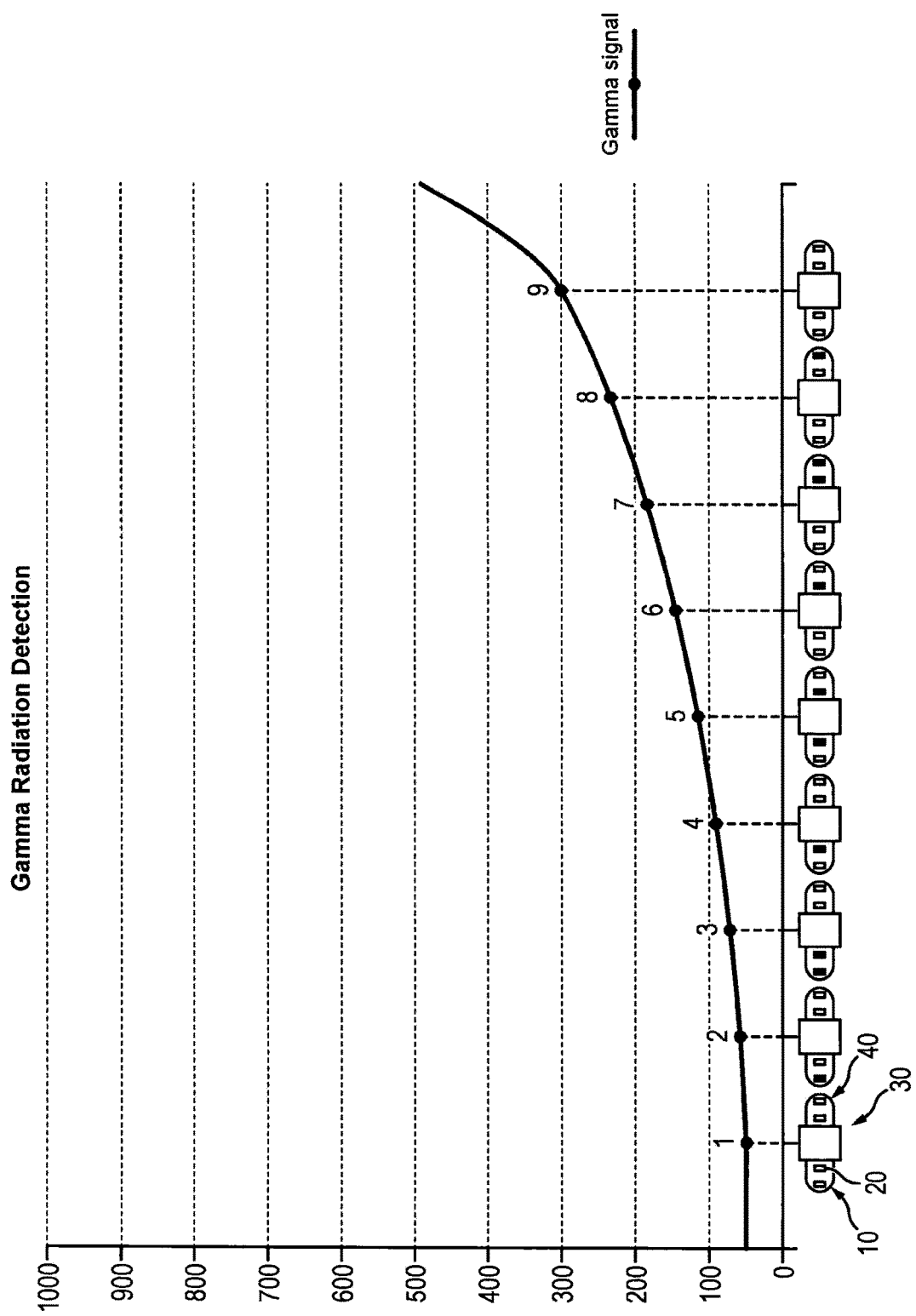
FIG. 3 schematically illustrates the correlation existing between the signal output by a substance or material sensor and the activation of the detection barriers following the nine aforementioned sequences.
Figure 5:
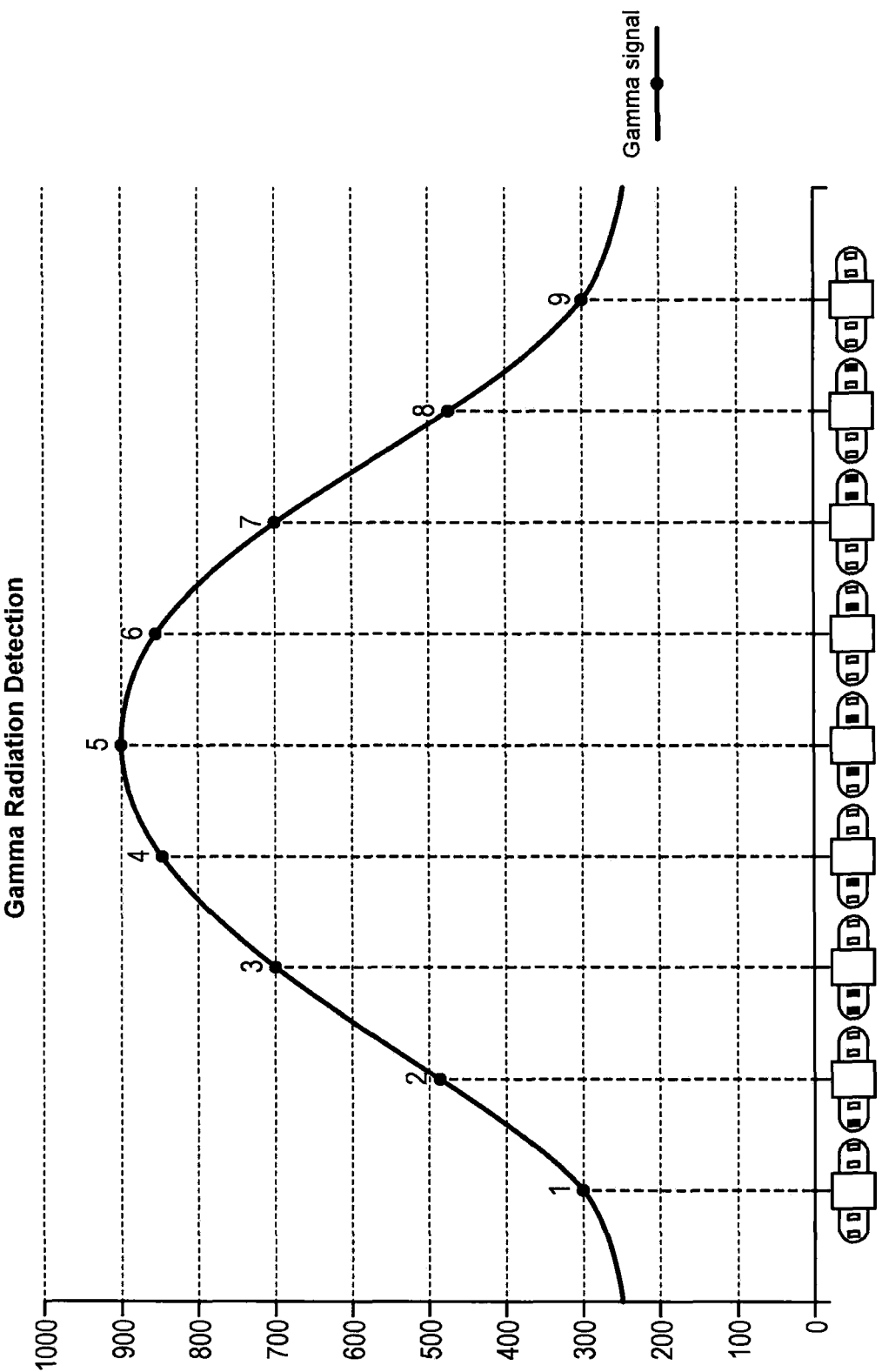
FIG. 5 represents the correlation between the signal output by a substance or material sensor and the activation of the barriers following the nine sequences of FIG. 4.
Figure 7:
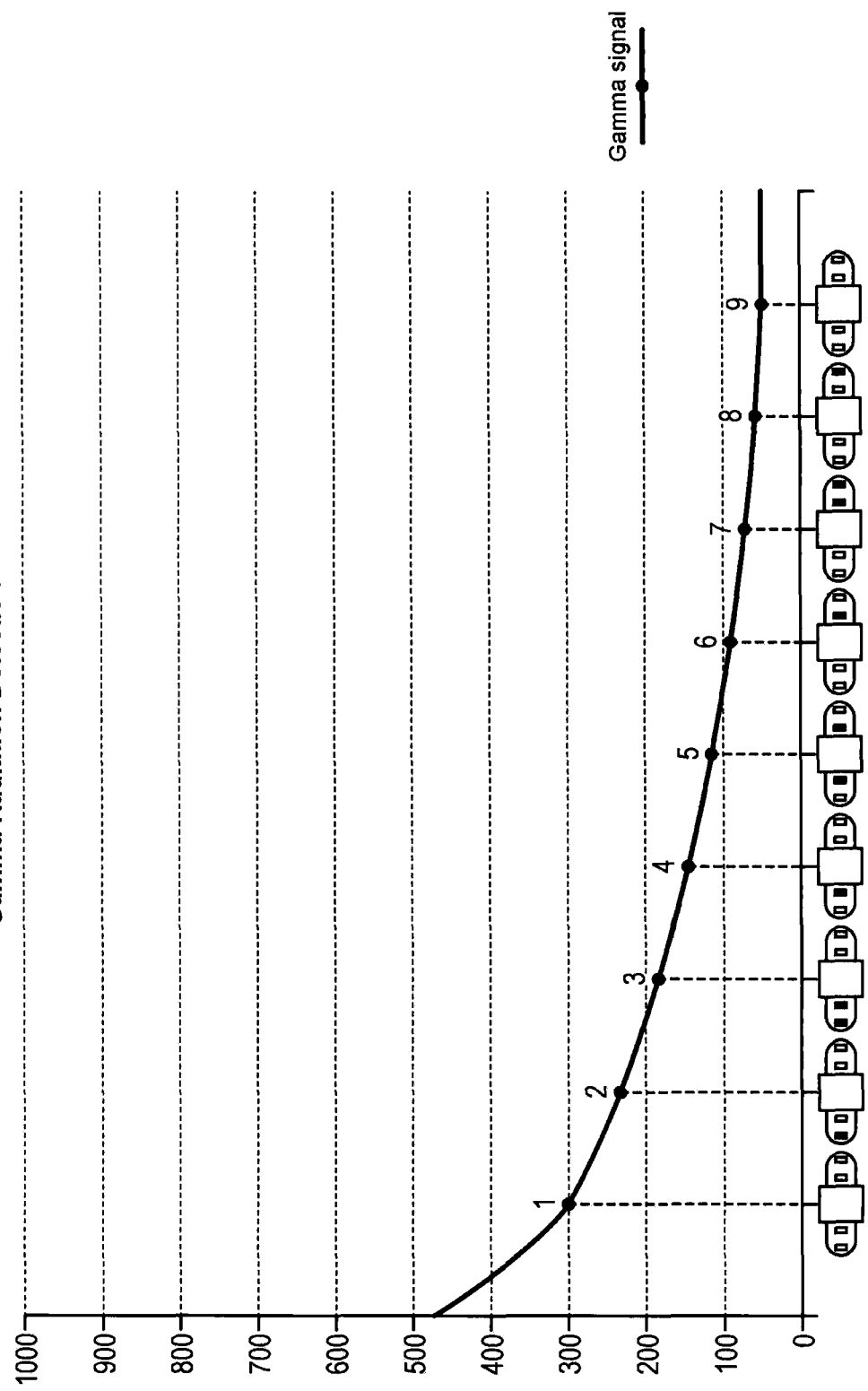
FIG. 7 represents the correlation existing between the signal output by a substance or material sensor and the activation of the corresponding detection barriers according to the sequences illustrated in FIG. 6.

FIGS. 3, 5 and 7 illustrate in the form of light rectangular areas the optical barriers 10, 20, 30, 40 corresponding to a deactivated position i.e. of no detection of an individual facing it, and in the form of black rectangular areas the barriers activated corresponding to the detection of an individual. In FIGS. 3, 5 and 7 are also represented the signal output by the substance or material sensors. The person skilled in the art will understand on examining FIG. 2 and FIG. 3 that on the passage through the portal of an individual without any dangerous substance or material, followed by an individual carrying a source of ionizing radiation, the signals output by the substance or material sensors gradually increase in intensity, the signal being at a maximum when the individual carrying the ionizing source is close to the entry of the portal, while the individual crossing the portal is detected in the portal exit sequence.

It can be seen on examining FIGS. 4 and 5 that the same signal continues to increase when the individual carrying the source of ionizing radiation crosses the portal. This signal has a peak or maximum when the individual is found at the centre of the portal, i.e. when the two most central barriers 20, 30 in the direction of passage are simultaneously activated. Then the amplitude of the signal decreases when the individual crosses the portal exit. Finally, it can be understood on examining FIGS. 6 and 7 that the signal of the substance or material sensors gradually decreases when the individual carrying the source of ionizing radiation has crossed the portal and is moving away from it while the portal is crossed by a new individual without any dangerous material or substance.

The portal in accordance with the invention is furthermore provided with logic means, integrated into the means 4, designed to determine from the series of activations of the barriers 10, 20, 30, 40, firstly the place and movement of any individual in the corridor or channel 5 of the portal, and secondly the correlations existing between the movement of an individual and signals output by the substance or material sensors. As illustrated in FIGS. 2 and 3 the signal output by the substance or material sensors gradually increases in correlation with the detection of an individual crossing the portal, the amplitude of the signal being at a maximum when the individual is detected exiting the portal, an individual is likely to be carrying a substance or material to be checked is approaching the portal without having crossed it. As illustrated in FIGS. 4 and 5 there is the presence of a signal output by the substance or material sensors which increases until an individual is located at the centre of the portal and then gradually decreases when the individual exits the portal, an individual carrying a substance or material to be checked is probably crossing the portal. Finally as illustrated in FIGS. 6 and 7 when the signal output by the substance or material sensors gradually decreases during the detection of an individual who is carrying a substance or material to be checked crossing the portal an individual who has previously cross the portal.

In the context of the invention as shown in the figures, provision is preferably made for a number of barriers greater than 3 to allow fine detection of the location of an individual when he or she crosses a portal. More precisely in the context of the invention, provision is preferably made for 4 optical barriers distributed along the direction of passage through the portal at a rate of 2 optical barriers 10, 20 upstream of the substance or materials detection sensors, i.e. at the portal entrance, and 2 barriers downstream of the substance or materials detection sensors, i.e. at the portal exit. Thus during a normal passage through a corridor 5 of the portal, from the entrance to the exit, an individual is successively detected by the entrance barrier 10, then the second barrier 20, the third barrier 30 and finally the exit barrier 40.

More precisely still, according to the present invention, preferably the gap separating at least the first two barriers 10, 20 from each other and the distance separating at least the last two barriers 30, 40 from each other is such that an individual is still detected by the upstream barrier 10 or 30, for example when it is detected by the next barrier 20 or 40. This provision makes it possible to detect any irregular suspicious movement of an individual inside the portal. The aforementioned provision also makes it possible to detect any attempt to return backwards inside a portal which can be considered as suspicious behaviour. In practice the distance separating two successive barriers 10, 20, 30, 40 is preferably between 15 and 30 cm, typically in the order of 20 cm.

Of course the present invention is not limited to the particular embodiments that have just been described but extends to any variant in accordance with its spirit. In particular, provision may of course be made for a number of optical barriers different from the preferably embodiment described previously, especially a number of barriers greater than 4. Where applicable the barriers 10, 20, 30, 40 can also be formed using other technology than optical technology.

Detection can also be operated (or reinforced/refined) not using a plurality of distinct detection barriers, but using a single correctly-placed video camera, with a suitable resolution in pixels, and which is coupled to means for processing the signal output by the video camera, making it possible to detect by pixel analysis the successive passage through a series of conceptual barriers corresponding to the location of the barriers described in the previous description. In the same way, the portal in accordance with the present invention can be equipped with a Doppler-type system making it possible to know the place and movement of an individual in the portal. The concept of "plurality of detection barriers distributed along the direction of passage through the portal" must thus be understood in a wider sense as encompassing all means making it possible to fulfil this function. In another variant, the signal output by the coils integrated into the panels or columns of the portal and intended to detect the presence of metal, can also be used to refine the assessment of the place and movement of an individual in the portal.

What is claimed is:

1. An individual access control portal comprising two panels or columns that define a through corridor, which panels or columns are equipped with sensors designed to detect substances or materials liable to be carried by individuals travelling through the portal, the portal being equipped with a plurality of individual detection barriers distributed along the direction of passage through the portal and a logic circuit attached to the plurality of barriers, firstly to determine from the series of activations of the barriers, the place and movement of an individual and secondly to establish the correlations existing between the movement of an individual and the signals output by the substance or material detection sensors, the logic circuit being designed to detect the correlation between a peak output by the substance or material sensors and the simultaneous activation of two barriers located nearest to the substance or material sensors.

2. The portal according to claim 1, wherein the barriers are optical barriers.

3. The portal according to claim 1, wherein a number of the barriers is greater than 3.

4. The portal according to claim 1, wherein a number of the barriers is equal to 4.

5. The portal according to claim 1, further comprising two barriers upstream of all of the substance or material sensors and two barriers downstream of all of the substance or material sensors.

6. The portal according to claim 1, wherein a distance separating two successive barriers in the direction of passage along the corridor or channel of the portal is between 15 and 30 centimeters.

7. The portal according to claim 1, wherein each barrier is designed to provide detection over almost the whole height of the passage corridor or channel.

8. The portal according to claim 1, wherein the barriers are optical barriers and each optical barrier is formed by a detection curtain making it possible to cover almost a whole height of the passage corridor or channel.

9. The portal according to claim 1, wherein the barriers are optical barriers and each optical barrier is formed by a plurality of intermittent beams making it possible to cover almost a whole height of the passage corridor or channel.

10. The portal according to claim 1, wherein the logic circuit is adapted to detect the successive crossing of the different detection barriers distributed along the direction of passage through the portal.

11. The portal according to claim 1, wherein the logic circuit is adapted to detect the successive crossing of a first entrance barrier, then a second barrier, and so on up to an exit barrier.

12. The portal according to claim 1, wherein the gap separating at least two first barriers from each other and the distance separating at least two last barriers from each other, are such that an individual is still detected by an upstream barrier when it is detected by the next barrier.

13. The portal according to claim 1, wherein the logic circuit is adapted to identify an attempt to return backwards inside the portal, when the detection does not correspond to a successive crossing of the different detection barriers distributed along the direction of passage through the portal.

14. The portal according to claim 1, wherein the logic circuit is adapted to identify a state of presence of an individual carrying a substance or material to be checked is approaching the portal without having crossed it, when the signal output by the substance or material detection sensors gradually increases in correlation with the detection of an individual crossing the portal, the amplitude of the signal being at a maximum when the individual is detected exiting the portal.

15. The portal according to claim 1, wherein the logic circuit is adapted to identify a state of presence of an individual crossing the portal and carrying a substance or material to be checked, when the signal output by the substance or material detection sensors gradually increases until an individual is located at the center of the portal and then gradually decreases when the individual leaves the portal.

16. The portal according to claim 1, wherein the logic circuit is adapted to identify a state of presence of an individual who has previously cross the portal and carrying a substance or material to be checked, when the signal output by the substance or material detection sensors gradually decreases upon detection of the crossing of the portal by an individual.

17. The portal according to claim 1, wherein the logic circuit includes means for determining whether an individual carrying a substance or material to be checked is approaching the portal, crossing through the portal, or has crossed through the portal based on a predetermined relationship between the peak output of the substance or material sensors and a sequence of activations of the plurality of detection barriers.

18. The portal according to claim 17, wherein the logic circuit further includes means for determining that the individual carrying the substance or material to be checked is crossing the portal in response to simultaneous activation of two barriers located nearest to the substance or material sensors and the peak output by the substance or material sensors.

19. An individual access control portal comprising two panels or columns that define a through corridor, which panels or columns are equipped with sensors designed to detect substances or materials liable to be carried by individuals travelling through the portal, the portal being equipped with a plurality of individual detection barriers distributed along the direction of passage through the portal and a logic circuit attached to the plurality of barriers, firstly to determine from the series of activations of said barriers, the place and movement of an individual and secondly to establish the correlations existing between movement of an individual and the signals output by the substance or material detection sensors, the logic circuit being designed to:
  detect the correlation between a peak output by the substance or material sensors and the simultaneous activation of two barriers located nearest to the substance or material sensors; and
  identify a state of presence of an individual crossing the portal and carrying a substance or material to be checked, when the signal output by the substance or material detection sensors gradually increases until an individual is located at the center of the portal and then gradually decreases when the individual leaves the portal.

20. The portal according to claim 19, wherein the logic circuit is further designed to:
  identify a state of presence of an individual carrying a substance or material to be checked is approaching the portal without having crossed it, when the signal output by the substance or material detection sensors gradually increases in correlation with the detection of an individual crossing the portal, the amplitude of the signal being at a maximum when the individual is detected exiting the portal, and
  identify a state of presence of an individual who has previously cross the portal and carrying a substance or material to be checked, when the signal output by the substance or material detection sensors gradually decreases upon detection of the crossing of the portal by an individual.

21. A method for detecting a substance or material carried by an individual travelling through an access control portal and for determining the location of the individual relative to the portal, the portal including two panels or columns that define a through corridor, the panels or columns being equipped with sensors designed to detect the substance or material, the method comprising:

determining the place and movement of the individual using a plurality of detection barriers distributed along a direction of passage through the portal, detecting the substance or material using the substance or material sensors, detecting a peak output by the substance or material sensors, determining whether the individual carrying the substance or material is approaching the portal, crossing through the portal, or has crossed through the portal based on a predetermined relationship between the peak output of the substance or material sensors and a sequence of activations of the plurality of detection barriers.

22. The method of claim 21 further comprising determining that the individual carrying the substance or material is crossing the portal in response to simultaneous activation of two barriers located nearest to the substance or material sensors and the peak output by the substance or material sensors.

23. The method of claim 22, wherein the step of determining the place and movement of an individual traveling through the portal is operated with optical barriers.

24. The method of claim 22, wherein the step of determining the place and movement of an individual traveling through the portal is operated with a number of barriers (10, 20, 30, 40) which is greater than 3.

25. The method of claim 22, wherein the step of determining the place and movement of an individual traveling through the portal is operated with a number of barriers (10, 20, 30, 40) which is equal to 4.

26. The method of claim 22, wherein the step of determining the place and movement of an individual traveling through the portal is operated with two barriers (10, 20) upstream of the substance or material sensors and two barriers (30, 40) downstream of the substance or material sensors.

27. The method of claim 22, wherein the step of determining the place and movement of an individual traveling through the portal is operated with successive barriers separated in the direction of passage along the corridor or channel (5) of the portal by a distance between 15 and 30 centimeters.

28. The method of claim 22, wherein the step of determining the place and movement of an individual traveling through the portal is operated with barriers (10, 20, 30, 40) designed to provide detection over almost the whole height of the passage corridor (5).

29. The method of claim 22, wherein the step of determining the place and movement of an individual traveling through the portal is operated with optical barriers and wherein each optical barrier (10, 20, 30, 40) is formed by a detection curtain making it possible to cover almost the whole height of the passage corridor (5).

30. The method of claim 22, wherein the step of determining the place and movement of an individual traveling through the portal is operated with optical barriers and wherein each optical barrier (10, 20, 30, 40) is formed by a plurality of intermittent beams making it possible to cover almost the whole height of the passage corridor (5).

31. The method of claim 22, wherein the step of determining the place and movement of an individual traveling through the portal with a plurality of individual detection barriers (10, 20, 30, 40) distributed along the direction of passage through the portal, comprises detection of successive crossing of the different detection barriers (10, 20, 30, 40) distributed along the direction of passage through the portal.

32. The method of claim 22, the step of determining the place and movement of an individual traveling through the portal with a plurality of individual detection barriers (10, 20, 30, 40) distributed along the direction of passage through the portal, comprises detection of successive crossing of a first entrance barrier (10), then a second barrier (20), and so on up to an exit barrier (40).

33. The method of claim 22, the step of determining the place and movement of an individual traveling through the portal with a plurality of individual detection barriers (10, 20, 30, 40) distributed along the direction of passage through the portal, is made with barriers having a gap separating at least two first barriers (10, 20) from each other and a distance separating at least two last barriers (30, 40) from each other, such that an individual is still detected by an upstream barrier (10, 30) when it is detected by the next barrier (20, 40).

34. The method of claim 22, wherein the step of determining the place and movement of an individual traveling through the portal with a plurality of individual detection barriers (10, 20, 30, 40) distributed along the direction of passage through the portal, comprises detection of an attempt to return backwards inside the portal, when the detection does not correspond to a successive crossing of the different detection barriers (10, 20, 30, 40) distributed along the direction of passage through the portal.

35. The method of claim 22, further comprising the step of detecting when the signal output by the substance or material detection sensors gradually increases upon detection of an individual crossing the portal, the amplitude of the signal issued from the substance or material detection sensors being at a maximum when the individual is detected exiting the portal, to detect the presence of an individual carrying a substance or material to be checked who is approaching the portal without having crossed it.

36. The method of claim 22, wherein the step of detecting simultaneous activation of two barriers located nearest to the substance or material sensors and the peak output by the substance or material sensors so as to establish correlations existing between the movement of an individual and the signals output by the substance or material detection sensors comprises the step of detecting when the signal output by the substance or material detection sensors gradually increases until an individual is located at the center of the portal and then gradually decreases when the individual leaves the portal, to detect the presence of an individual crossing the portal and carrying a substance or material to be checked.

37. The method of claim 22, further comprising the step of detecting when the signal output by the substance or material detection sensors gradually decreases upon detection of the crossing of the portal by an individual, the amplitude of the signal issued from the substance or material detection sensors being at a maximum when the individual is detected entering the portal, to identify the presence of an individual who has previously crossed the portal and carrying a substance or material to be checked.

\* \* \* \* \*